(12) United States Patent
Mohr et al.

(10) Patent No.: US 9,342,510 B1
(45) Date of Patent: May 17, 2016

(54) STATE HANDLES

(75) Inventors: Alex Mohr, Piedmont, CA (US); Tom Lokovic, Murrysville, PA (US)

(73) Assignee: Pixar, Emeryville, CA (US)

( * ) Notice: Subject to any disclaimer, the term of this patent is extended or adjusted under 35 U.S.C. 154(b) by 1190 days.

(21) Appl. No.: 12/255,971

(22) Filed: Oct. 22, 2008

(51) Int. Cl.
*G06F 17/30* (2006.01)

(52) U.S. Cl.
CPC .................................... *G06F 17/30* (2013.01)

(58) Field of Classification Search
CPC ..................................................... G06F 17/30
See application file for complete search history.

(56) References Cited

U.S. PATENT DOCUMENTS 5,835,771 A * 11/1998 Veldhuizen .................. 717/154
5,970,243 A * 10/1999 Klein et al. .................. 717/113
2006/0101420 A1 * 5/2006 Shinnar et al. ............... 717/130

* cited by examiner

*Primary Examiner* — Rehana Perveen
*Assistant Examiner* — Huen Wong
(74) *Attorney, Agent, or Firm* — Patterson + Sheridan

(57) ABSTRACT

State handles mark application data states within a sequence of operations for preservation. Applications can maintain non-linear sets of operations that include multiple sequences of operations between state handles. Applications can determine a sequence of operations between any two state handles, allowing applications to change from the data state associated with one state handle to the data state associated with another state handle. The sequence of operations between any two state handles may include executing operations and/or reversing operations. An application automatically adds new branches in the set of operations to preserve the sequences of operations necessary to reconstruct data states of previously set handles and removes branches that are not needed. Applications may use state handles to implement non-linear undo and redo functions, to validate journal entries, to combine incremental operations into a cumulative operation, and to speculatively execute operations for error detection, user guidance, or performance optimization.

15 Claims, 10 Drawing Sheets

STATE HANDLES

BACKGROUND

The invention relates to the field of software applications allowing users to create, modify, and manipulate data. Many software applications allow users to create, modify, or manipulate data. These applications are referred to generally herein as data applications. For example, computer graphics software applications allow users to create three-dimensional models of objects, specify animation, lighting, and shading data, and generate one or more rendered images as a result.

Regardless of the type of application and data, users often create, modify, and manipulate data over multiple iterations. Typically, users provide commands to the application, which in turn performs one or more operations to create, modify, or otherwise manipulate data. In addition to refining the data through multiple iterations, users frequently backtrack or revert to previous versions of data to correct mistakes or to explore alternatives. Many data applications include undo and redo functionality. Typically, the undo function allows users to reverse the effects of a sequence of one or more previously performed operations. Following the reversal of a sequence of one or more previously performed operations, a typical redo function re-executes one or more of the sequence of reversed operations.

One problem with the undo and redo operations of prior data applications is that the undo/redo queue is typically linear. Users may undo any sequence of operations; however, if a user performs one or more new or additional operations following the reversal of a sequence of operations, this sequence of operations is removed from the undo/redo queue and cannot be re-executed using the redo command.

SUMMARY

An embodiment of the invention includes state handles to mark application data states within a sequence of operations for preservation. Using state handles, applications can maintain non-linear sets of operations that include multiple sequences of operations between state handles. Applications can determine a sequence of operations between any two state handles, allowing applications to change from the data state associated with one state handle to the data state associated with another state handle. The sequence of operations between any two state handles may include executing operations and/or reversing operations.

In an embodiment, a data application automatically adds new branches in the set of operations to preserve the sequences of operations necessary to reconstruct data states of previously set handles. An additional embodiment of a data application also automatically removes branches in the set of operations that are not needed to reconstruct data states of state handles.

Embodiments of the invention can use state handles to implement non-linear undo and redo functions. An embodiment of the invention includes a user interface for navigating between data states associated with state handles. One example user interface includes a graph visualization showing the topological relationships between state handles in a graph of operations. Another user interface includes a selectable list of state handles.

An embodiment of the invention can also use state handles to validate journal entries representing sequences of operations. An embodiment sets a state handle and performs a sequence of operations. The embodiment also generates journal entries corresponding with the sequence of operations. The state of the application data following the sequence of operations is stored. An embodiment then reverts the data state back to the state handle and executes the journal entries. The resulting data state is compared with the stored data state to validate the journal entries.

An embodiment of the invention can also use state handles to combine incremental operations into a cumulative operation. In this embodiment, a state handle is set prior to execution of a first incremental operation. As incremental operations are received, a data state following the received incremental operations is determined. An embodiment then reverses the sequence of operations back to the state handle and adds a new cumulative operation to recreate this data state.

An embodiment of the invention can also use state handles to speculatively execute operations for error detection, user guidance, or performance optimization.

BRIEF DESCRIPTION OF THE DRAWINGS

The invention will be described with reference to the drawings, in which.

In the drawings, the use of identical reference numbers indicates identical components.

DETAILED DESCRIPTION

Figure 1A:
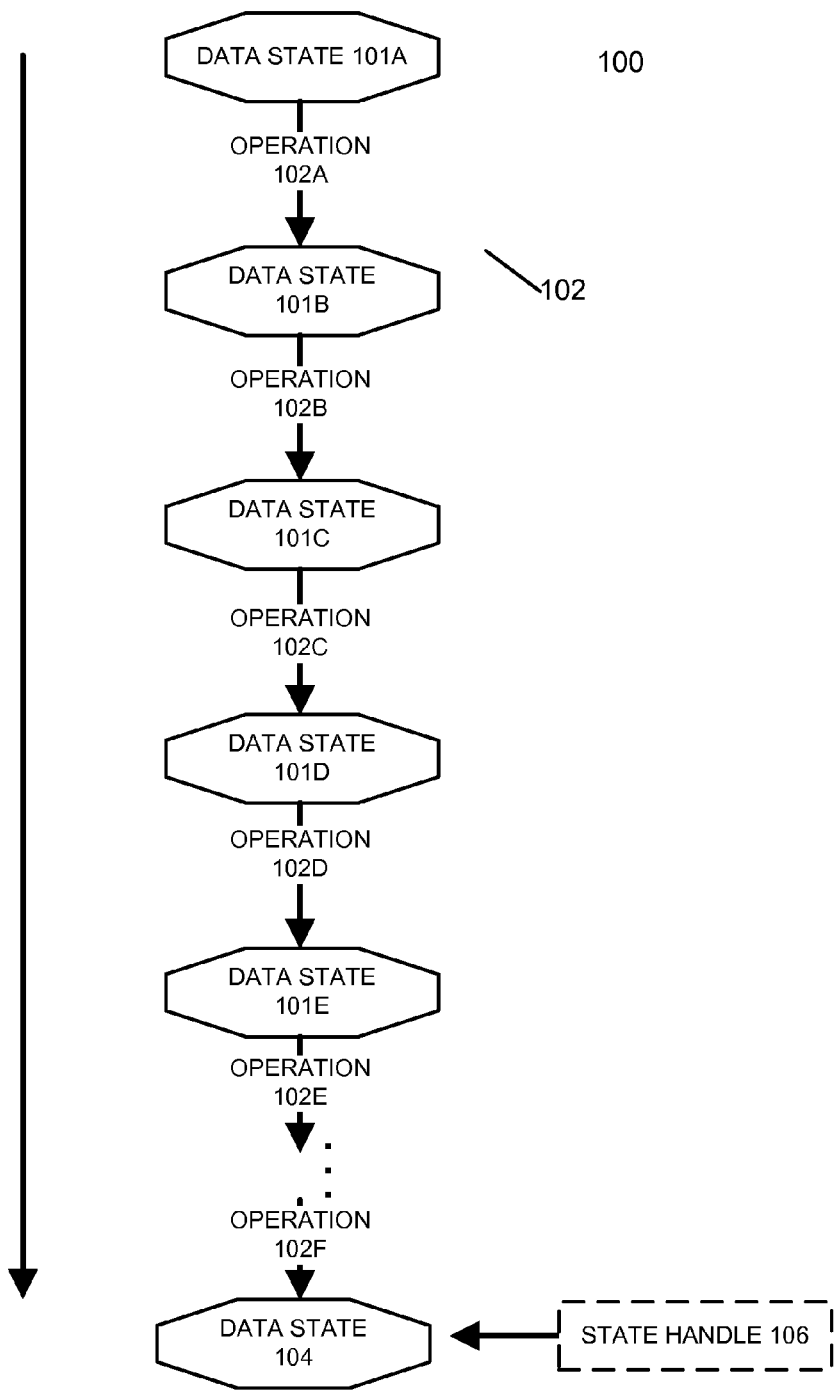
FIGS. 1A-1D illustrate an example implementation of state handles in an application according to an embodiment of the invention.

FIGS. 1A-1D illustrate an example implementation of state handles in an application according to an embodiment of the invention. FIG. 1A illustrates a first portion 100 of the operation of state handles in a data application. In portion 100, the data application maintains a record of the sequence of operations 102 responsible for the current data state 104. An operation, such as operations 102a, 102b, 102c, 102d, 102e, or 102f, may include a description of one or more functions performed by the data application in response to the application command; one or more input parameters associated with these functions; and/or a specification or copy of the data affected by the application command. In a further embodiment, an operation may include scripting or executable code that is executed to implement data application functions in response to application commands.

The sequence of operations 102 may be created and maintained in a number of ways. For example, the data application may generate one or more corresponding operations for each application command received by the data application from a user, a script, or another application. An embodiment of the data application performs the function associated with the received application command. If the function is successfully completed, an embodiment of the data application adds these generated operations to the sequence of operations 102. Any type of data structure known in the art may be used to maintain the sequence of operations 102, such as arrays, linked lists, stacks, queues, tree structures, and undirected and directed graph data structures.

In an embodiment, the sequence of operations 102 represents the data application functions needed to change data from an initial state to its current data state 104 following the most recently executed application command. Similarly, any portion of the sequence of operations 102 from the first operation 102a to any intermediate operation within the sequence 102 represents the data application functions needed to change data from its initial data state 101a to the data state following that intermediate operation.

For example, operation 102a changes data from data state 101a to data state 101b. Operation 102b changes data from data state 101b to data state 101c. Operation 102c changes data from data state 101c to data state 101d. Operation 102d changes data from data state 101d to data state 101e. Operations 102e, 102f, and optionally any intermediate operations change data from data state 101e to data state 104.

As discussed in detail below, an embodiment of the invention allows data applications to non-destructively change or restore data states represented by non-linear sequences of operations. To facilitate these changes, an embodiment of the invention allows users, the data application, or other applications to set state handles. A state handle is a marker associated with an operation at any location in a set or sequence of operations. The state handle indicates the data state following its associated operation is of interest to a user, the data application, or another application. In an embodiment, the data application preserves all of the operations necessary to change data from its initial state to the data state associated with the state handle. This allows the data application to reconstruct the data state associated with the state handle at any time, regardless of the current data state. In another embodiment, the data application preserves the data state associated with a state handle directly, rather than as a sequence of operations.

In the example of FIG. 1A, a state handle 106 has been associated with the data state 104. As a result, an embodiment of the data application will preserve all or a portion of the sequence of operations 102 necessary to reconstruct the data state 104 from an initial data state. Embodiments of the invention may allow state handles such as state handle 106 to be set manually, for example in response to a command from a user or another application, or automatically, for example in response to specific commands, application functions, or operations.

Figure 1B:
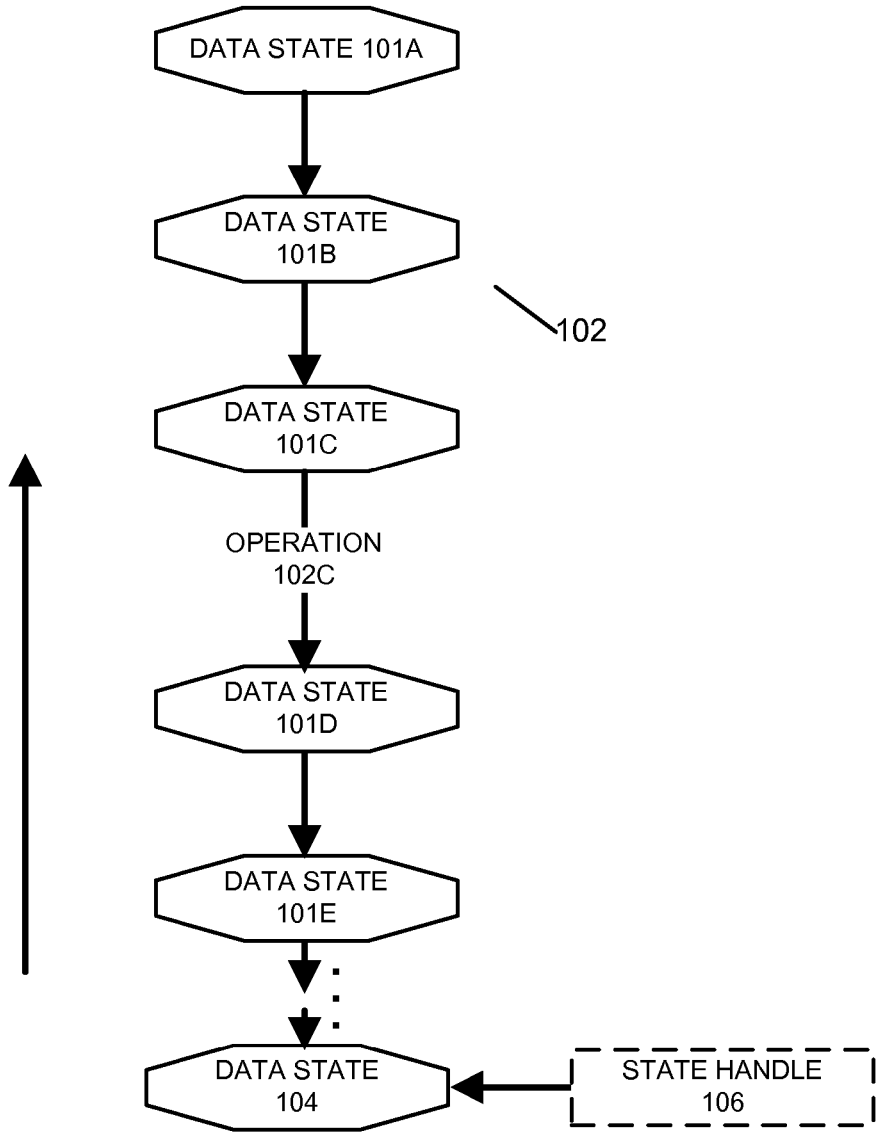

FIG. 1B illustrates a second portion 110 of the operation of state handles in a data application. Data applications may allow for commands to be reversed using an undo command or function. In response to an undo command, an embodiment of a data application reverses one or more of the operations in the sequence of operations 102 to revert the application data from the data state 104 to a previous data state.

Embodiments of data applications may implement undo commands using any technique known in the art. In an embodiment, each operation in the sequence of operations 102 is invertible. An invertible operation has a mathematical or computational inverse, such that if the performing the operation on a given input results in an output, then performing the inverse of the operation on this output results in the given input. In some cases, operations without mathematical or computational inverses, such as operations that combine or composite data, may be made invertible by caching the input data used by each instance of the operation. An undo function retrieves the cached input data of the operation to reverse this operation.

In the example of FIG. 1B, a portion of the sequence of operations 102 has been reversed up to and including operation 102c using an undo function. As a result, the application data will revert from data state 104 back to data state 101c. Embodiments of the data application allow for undo functions to revert the application data back to any arbitrary previous data state, up to and including the initial state of the application data.

In further embodiments, the data application may include a redo function allowing some or all of the operations following operation 102c, or any other operation, in the sequence of operations 102 to be re-executed, allowing the data application to reconstruct any arbitrary intermediate data state of the application. Thus, users, the data application, and other applications may linearly navigate through the sequence of operations 102 to reconstruct any data state of the application data from its initial state up to and including the data state following the most recently processed operation, including data states 101a, 101b, 101c, 101d, 101e, and 104.

In prior data applications, the sequence of operations used to reconstruct application data states is strictly linearly. This limits flexibility in creating, modifying, and otherwise manipulating application data. For example, if a user reverts the application data to data state 101c, as shown in FIG. 1B, the user of prior data applications cannot modify or add operations to the sequence of operations 102 without destroying the subsequent data state 104. In prior data applications, any modifications to the sequence of operations 102 while the application data is in an intermediate data state, such as data state 101c, will result in the loss of any data states subsequent to the modification in the sequence of operations 102.

Figure 1C:
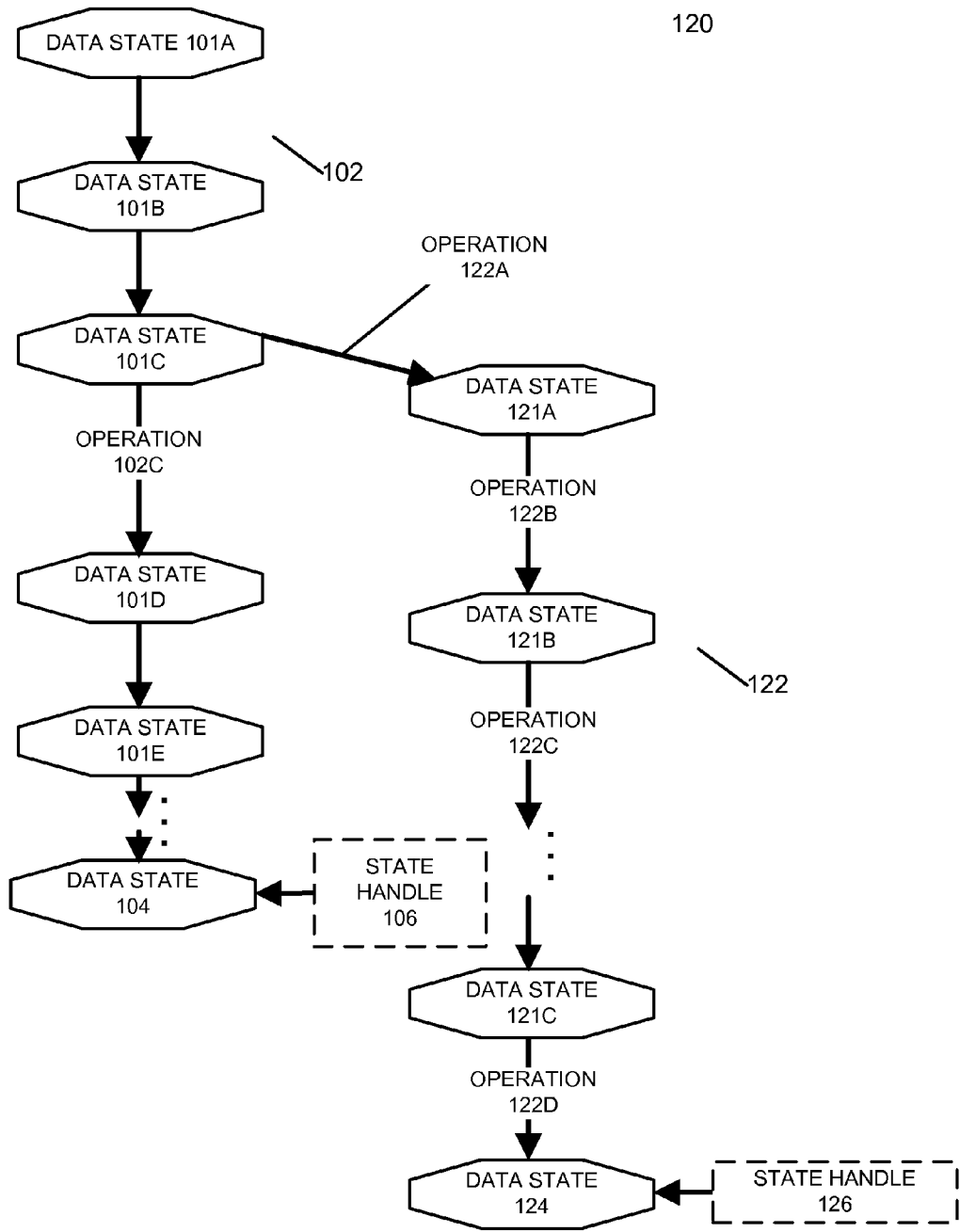

An embodiment of the invention overcomes these limitations by allowing for non-linear sequences of operations. FIG. 1C illustrates a third portion 120 of the operation of state handles according to an embodiment of the invention. Portion 120 occurs following the reversion of the application data from data state 104 to data state 101c immediately preceding operation 102c in the sequence of operations 102. While the application data is in data state 101c, a user, the data application, or another application provides the data application with one or more additional commands, which cause the data application to perform a second sequence of operations 122. In this example, the second sequence of operations begins with operation 122a.

Rather than overwriting the portion of the sequence of operations 102 following data state 101c with the second sequence of operations 122, an embodiment of the data application maintains the second sequence of operations 122 separately from the sequence of operations 102. In an embodiment, operation 122a, which begins the second sequence of operations 122, is linked or associated with data state 101c. Thus, data state 101c is associated with two subsequent operations, operation 102c and operation 122a. In this example, the association of operation 122a with data state 101c specifies that the second sequence of operations 122 begins following data state 101c in the first sequence of operations 102.

Like the first sequence of operations 102, the second sequence of operations 122 can include any arbitrary number of operations. In this example, the second sequence of operations 122 includes operation 122a changing application data from data state 101c to data state 121a. Similarly, operation 122b changes application data from data state 121a to data state 121b. Operation 122c and optionally any intermediate operations change application data from data state 121*b* to data state 121*c*. Operation 122*d* changes application data from data state 121*c* to data state 124. Following the execution of the second sequence of operations 122, the application data is in data state 124. In this example, a user, the data application, or another application adds a second state handle 126 to indicate that the data state 124 is also of interest and should be preserved.

Figure 1D:
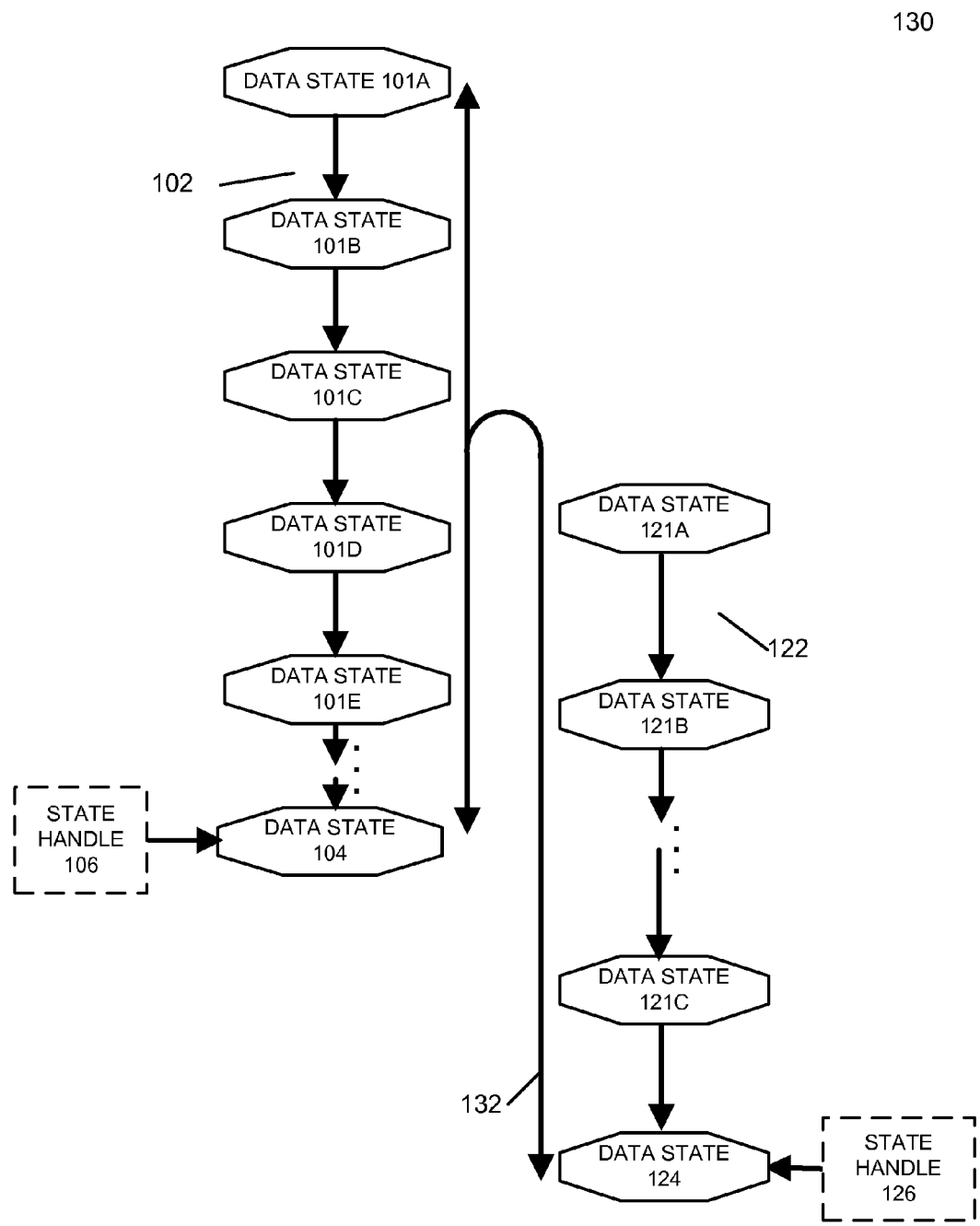

FIG. 1D illustrates a fourth portion 130 of the operation of state handles according to an embodiment of the invention. Portion 130 of the operation of state handles occurs following portion 120. In portion 130, users, the data application, and other applications may use undo and redo functions in a non-linear manner to change 132 between the application data between data state 104, marked by state handle 106, and data state 124, marked by state handle 126. For example, to change the application data from data state 124 to data state 104, an embodiment of the data application reverses the entire second sequence of operations 122 and then re-executes the portion of the sequence of operations 102 following operation 112. Conversely, to change the application data from data state 104 to data state 124, an embodiment of the data application reverses a portion of the sequence of operations 102 back to operation 112 and then re-executes the entire second sequence of operations 122.

In a further embodiment, users, the data application, and other applications can also use the undo and redo functions of the data application to change 132 the application data to any arbitrary data state within the sequence of operations 102 or the second sequence of operations 122, including data states 101*a*, 101*b*, 101*c*, 101*d*, 101*e*, 104, 121*a*, 121*b*, 121*c*, and 124.

Figure 2:
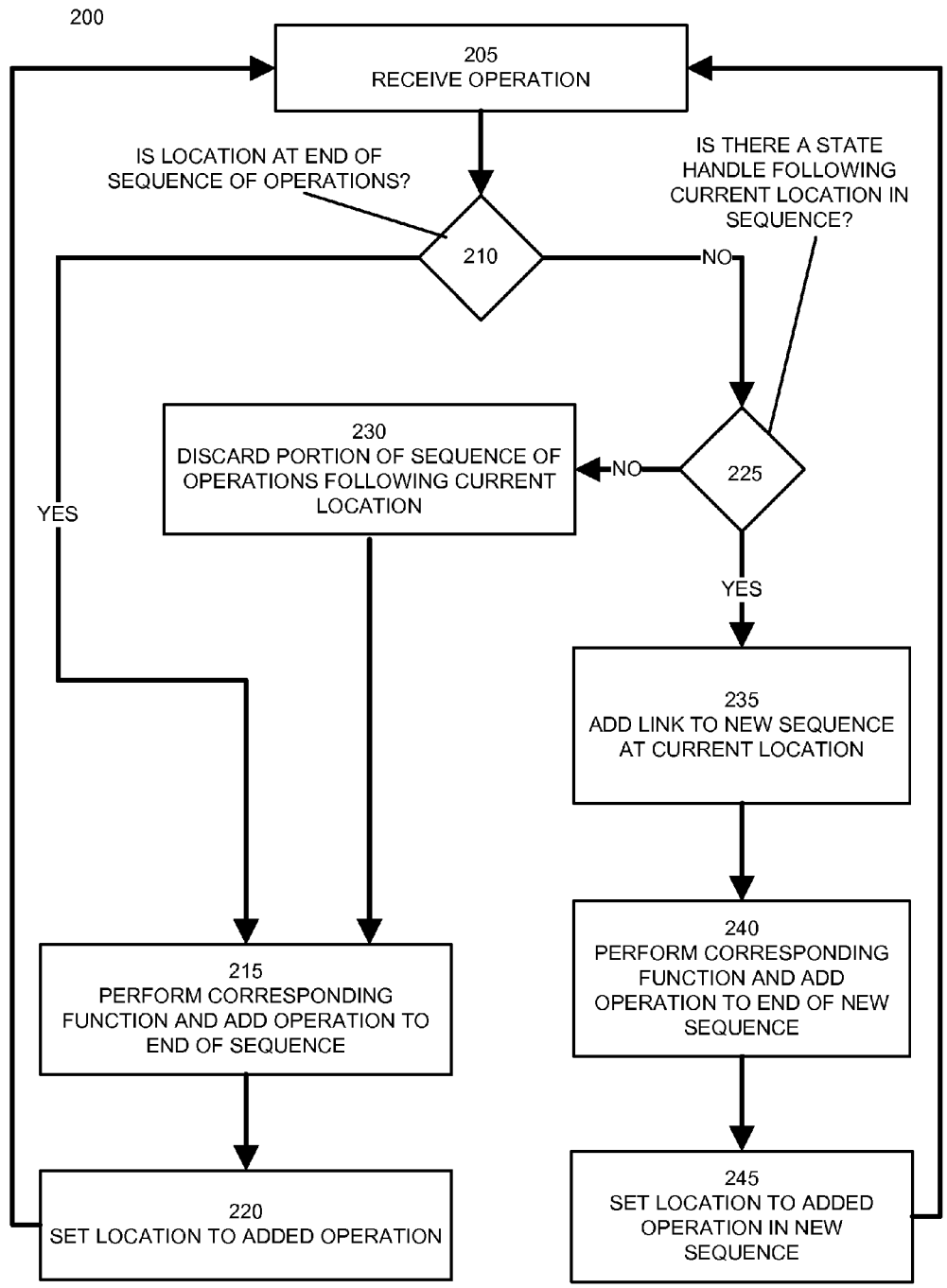
FIG. 2 illustrates a method of automatically creating and optimizing non-linear sequences of operations according to an embodiment of the invention.

Embodiments of the invention may add or remove any arbitrary quantity of "branches" of sequences of operations in response to new or modified operations. In one embodiment, the data application automatically adds branches of sequences of operations and optimizes the set of operations by automatically removing unneeded sequences. FIG. 2 illustrates a method 200 of automatically creating and optimizing non-linear sequences of operations according to an embodiment of the invention.

In step 205, an operation is received for processing by method 200. In an embodiment, an operation may be generated in response to a command from a user or another application, or generated by the data application itself.

In an embodiment, a data application or other entity maintains a current location indicator for the set of operations previously performed. This current location indicator associates the current data state of the application data with a location in the set or sequence of operations previously performed. At decision block 210, method 200 determines if the current location in the set of operations is at the end of a sequence of operations. If there are any operations in the set of operations subsequent to the current location, then the current location is not at the end of a sequence of operations.

If the current location is at the end of a sequence of operations, then method 200 proceeds to step 215. Step 215 performs one or more data application functions corresponding with the received operation. If these functions are successfully completed, then an embodiment of step 215 adds the received operation to the set of operations at the current location. Step 220 then advances the current location to the location following the added operation.

Returning to decision block 210, if the current location is not at the end of a sequence of operations, then method 200 proceeds to decision block 225. Decision block 225 then determines if there are any state handles associated with any operation following the current location in the sequence of operations. If there are no state handles in the set of operations following the current location, then step 230 discards the portion of the set of operations following the current location. Step 230 may discard these operations, because no data states following the current location need to be preserved or reconstructed.

Following step 230, steps 215 and 230 perform data application functions, add the received operation to the set of operations, and update the current location, as described above.

Returning to decision block 225, if there are state handles in the set of operations following the current location, then the portion of the set of operations between the current location and one or more subsequent state handles, at the least, needs to be saves so that the data state associated with a subsequent state handle can be reconstructed. To preserve operations used to reconstruct the data states associated with subsequent state handles, an embodiment of method 200 proceeds to step 235.

Step 235 adds a link between the current location in the set of operations and a new sequence of operations. In step 240, an embodiment of the data application performs one or more functions corresponding with the received operation. If these functions are successfully completed, then step 240 adds the received operation to the new sequence of operations. Step 245 then updates the current location to follow the added operation in the new sequence of operations.

Following step 245 or step 220, an embodiment of method 200 optionally returns to step 205 to receive additional operations for processing.

Figure 3A:
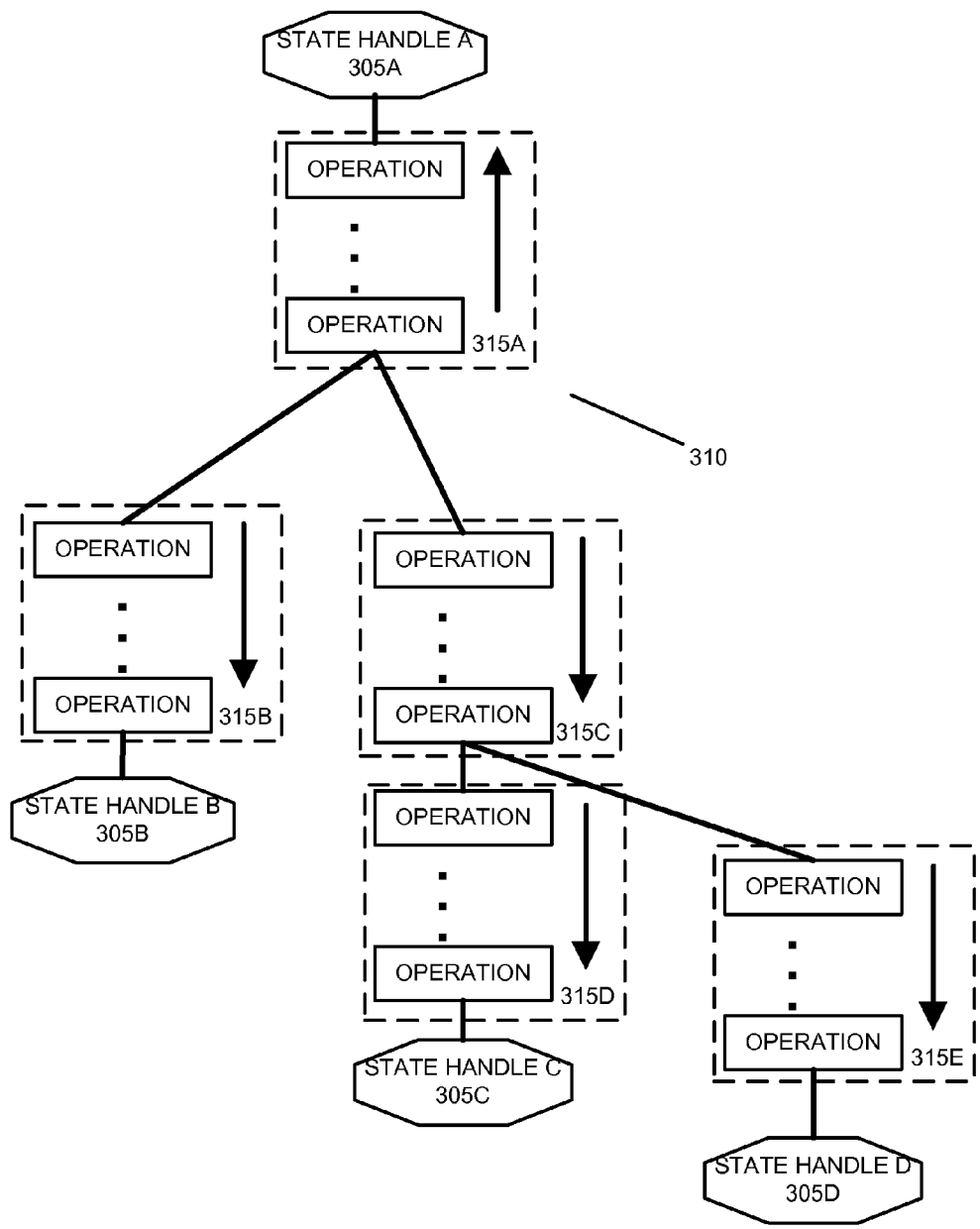
FIGS. 3A-3B illustrate example user interfaces for using state handles according to an embodiment of the invention.
Figure 3B:
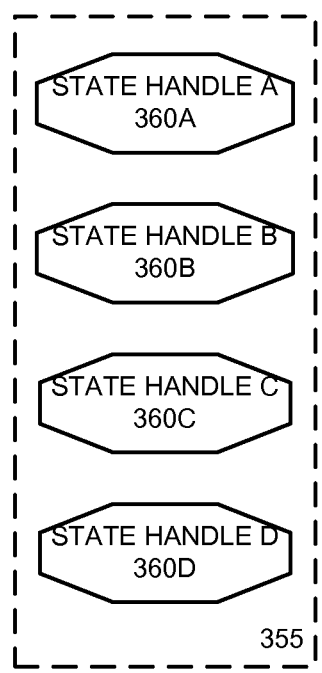

FIGS. 3A-3B illustrate example user interfaces for using state handles according to an embodiment of the invention. FIG. 3A illustrates a first example user interface 300 for using state handles according to an embodiment of the invention. User interface 300 includes state handle A 305*a*, state handle B 305*b*, state handle C 305*c*, and state handle D 305*d*. State handles 305 may be represented as icons or other user interface entities. In an embodiment, a user selects a state handle to change the application data from its current data state to the data state associated with the selected state handle.

User interface 300 also includes a graph visualization 310 that shows the relationships between the state handles 305. The graph visualization 310 can include representations of the sequences of operations 315 between the state handles 305. The representations of sequences of operations 315 may include lists of the actual operations within each sequence of operations. Alternatively, the representations of sequences of operations 315 may hide the actual operations from the user for clarity and ease of navigation. In further embodiments, a visual indicator, such as an arrow, is used to indicate the ordering of a sequence of operation. In an embodiment, the topology of the graph visualization 310 matches the topology of sequences of operations between the state handles.

FIG. 3B illustrates a second example user interface 350 for using state handles according to an embodiment of the invention. Example user interface 350 includes a list 355 of state handles 360 available for selection by a user, including state handles 360A, 360B, 360C, and 360D. Selecting any of the state handles 360A-D in list 355 changes the data state of the application data to the data state associated with the selected state handle. Embodiments of user interface 350 may arrange state handles 360 in list 355 in any number of ways, including by state handle name or by order of creation.

Further embodiments of user interfaces 300 and 350 may include functions for adding new state handles based on the current data state of application data and removing state handles.

In general, embodiments of data applications change application data from one data state to another data state by determining a path from the current data state to the desired data state or state handle through the graph of operations in a set of operations. A typical path will often include reversing some sequences of operations and re-executing other sequences of operations.

For example, to change the data state from the data state associated with state handle A 305a to that of state handle B 305B, an embodiment of the data application would reverse or undo the sequence of operations 315a and then perform the sequence of operations 315b. Similarly, to change the data state from state handle B 305b to state handle C 305c, and embodiment of the data application would reverse or undo the sequence of operations 315b and execute sequences of operation 315c and 315d. To change the data state from state handle C 305c to state handle D 305d, an embodiment of the data application would reverse the sequence of operations 315d and execute the sequence of operations 315e.

Embodiments of the invention may use graph traversal techniques known in the art to determine an efficient path, which corresponds to a set of operations to reverse and/or perform, to reach the desired data state. For example, a graph of state handles and sequences of operations such as that visualized by FIG. 3A may be re-rooted at the current data state and then traversed to find an efficient path through the graph.

In further embodiments, an application programming interface allows other applications to similarly change the data state of the application data.

State handles may be used by users to specify multiple data states of the application data. Users may change the application data between the data states of different state handles to compare the results of different sequences of operations. In addition to implementing non-linear undo and redo functions, state handles may be used to implement other functions of data applications.

Validating application journal entries is one type of function of a data application enabled by state handles. In an embodiment, a data application may generate an application journal entry corresponding with each operation of the data application. An application journal entry may include script or executable code enabling the data application to reproduce the corresponding operation. A set of one or more application journal entries may be used as a script or macro to repeatedly perform complicated operations on different selections of application data. A set of application journal entries may be exported or saved for later use for one or more users.

Figure 4:
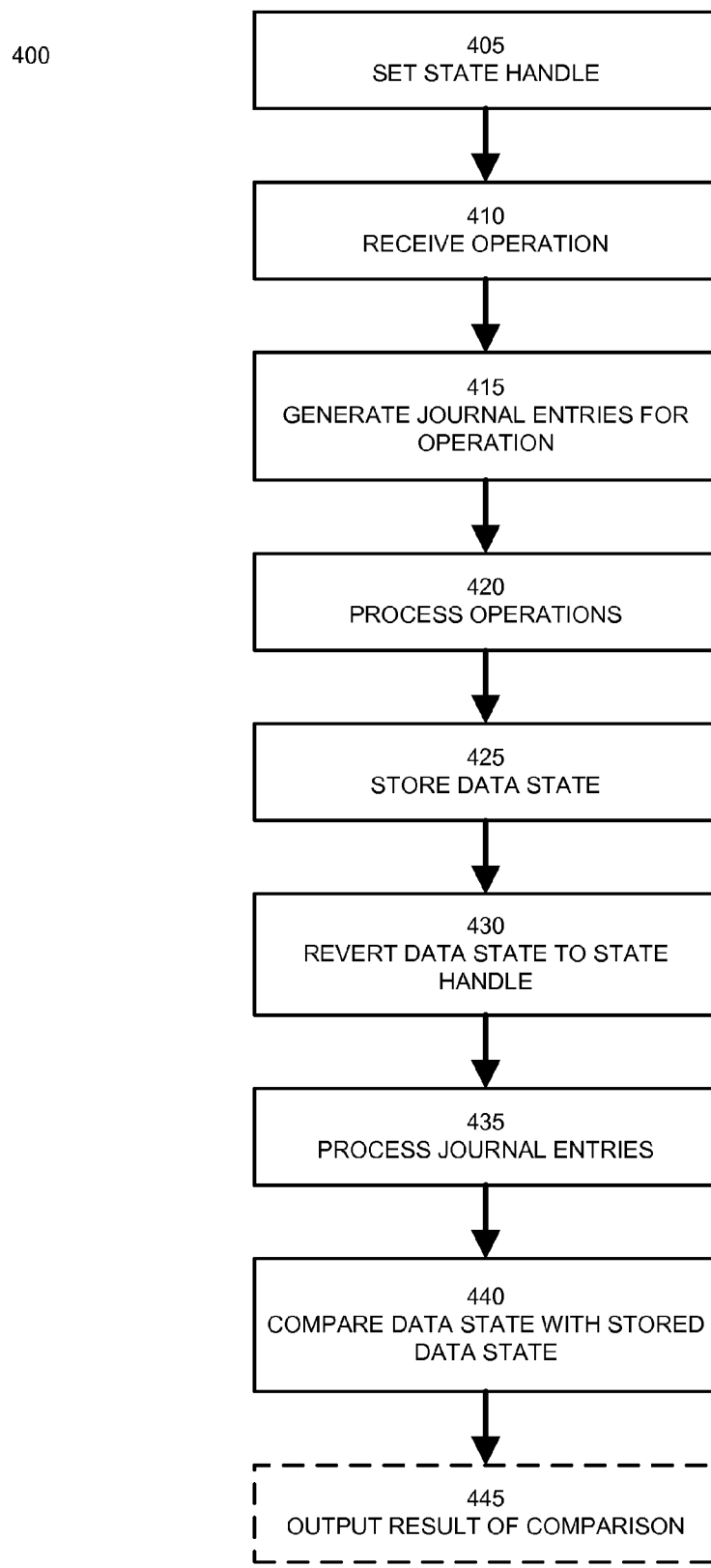
FIG. 4 illustrates a method of validating application journal entries using state handles according to an embodiment of the invention.

After selecting a set of application journal entries, an embodiment of the invention uses state handles to validate the set of application journal entries. Validation ensures that a set of application journal entries changes the data state of application data in the same manner as the associated operations of the data application. FIG. 4 illustrates a method 400 of validating application journal entries using state handles according to an embodiment of the invention.

Step 405 of method 400 sets a state handle for the current data state of application data. Step 410 then receives an operations to be performed by the data application. Step 415 generates one or more journal entries corresponding with the received operation. In step 420, the operation is provided to the data application for processing, resulting in a change in the data state of the application data. Steps 410, 415, and 420 may be repeated for additional operations to be included in the set of journal entries to be validated.

Following the receipt and processing of all of the operations to be included in the set of journal entries, step 425 stores the data state of the application for future comparison.

Step 430 reverts the data state of the application data back to the data state associated with the state handle set in step 405. Following step 430, step 435 processes the set of journal entries previously generated by one or more iterations of step 415. For each journal entry, the data application performs at least one operation on the application data, changing the data state of the application data.

Following the processing of the journal entries, step 440 compares the resulting data state of the application with the previously stored data state. If these data states match, then the function of journal entries matches that of the associated operations. Thus, the set of journal entries are valid. Conversely, if the data state following step 435 does not match the previously stored data state, then the journal entries are not valid. Optional step 445 then outputs the results of the comparison.

Another application of state handles consolidates multiple incremental operations into a single cumulative operation. For example, a data application may allow a user to interactively edit a model of an object by dragging a portion of the model to a new location within a graphical user interface. When the user drags the portion of the model, an incremental operation is generated representing an incremental change of the data state of the model, such as the movement of the portion of the model from its initial position to an intermediate position. As the user further moves the portion of the model from its prior position to a new position, another incremental operation is generated to represent this incremental change in the data state. This process is repeated as the user drags the portion of the model to its new position. Often, large numbers of incremental operations are generated as the portion of the model is moved to its final position. In this situation, it is burdensome for users to undo a long sequence of incremental operations. Additionally, a long sequence of incremental operations increases the computational processing required to change data states between state handles.

Figure 5:
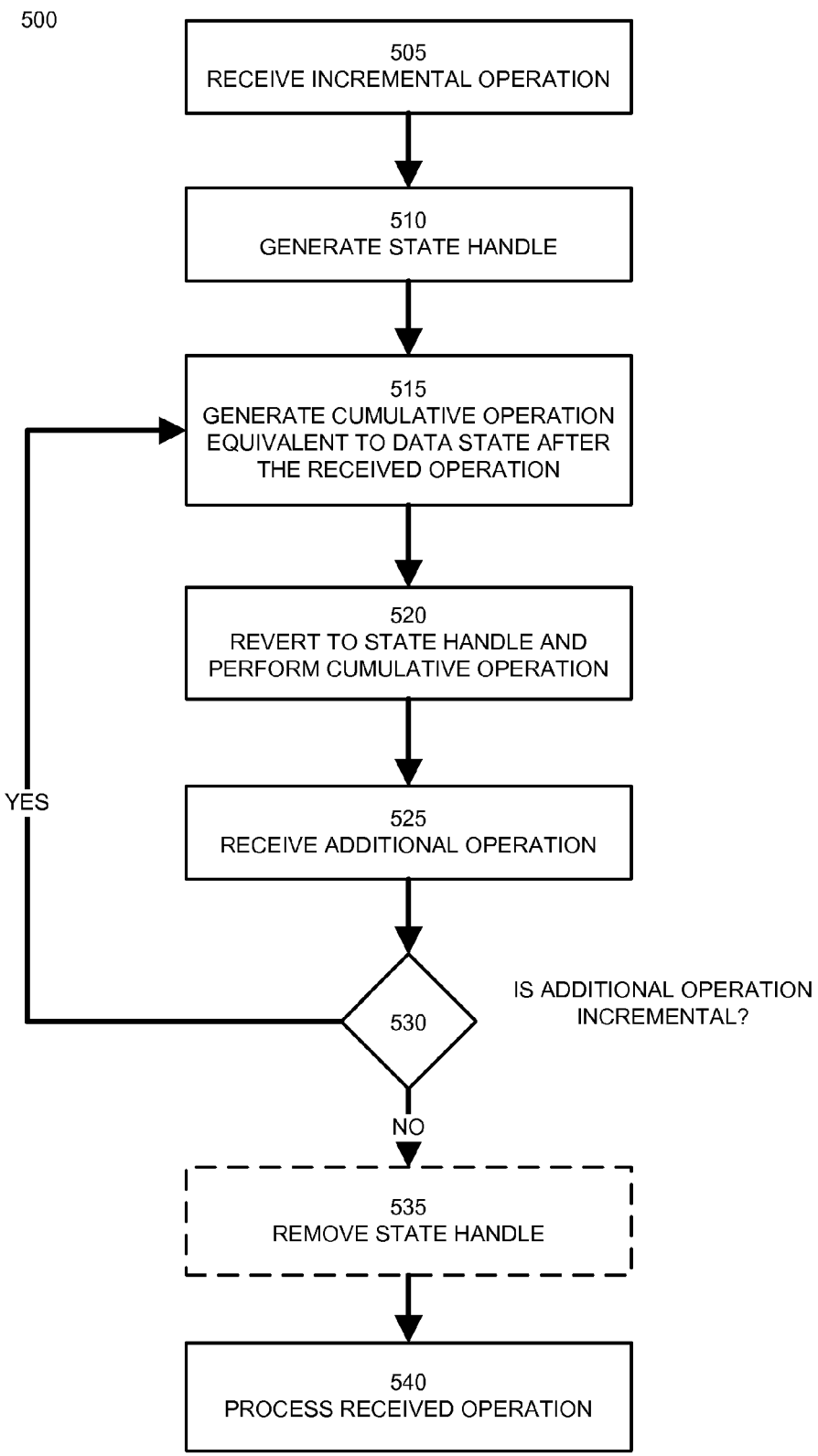
FIG. 5 illustrates a method of combining incremental operations into a cumulative operation using state handles according to an embodiment of the invention.

Embodiments of the invention use state handles to combine sequences of consecutive incremental operations into a single cumulative operation. FIG. 5 illustrates a method 500 of combining incremental operations into a cumulative operation using state handles according to an embodiment of the invention. Step 505 receives an initial incremental operation for processing. Step 510 generates a state handle representing the current data state of the application data, prior to the execution of this received incremental operation.

Step 515 generates a cumulative operation equivalent to the data state following the execution of the most recently received incremental operation. In an embodiment, step 515 provides the most recently received incremental operation to the data application for execution. Following the execution of this incremental operation, step 515 compares the current data state with the data state associated with the state handle. Step 515 uses the difference between these data states to determine a cumulative operation representing the effects of one or more previously processed incremental operations on the data state of the application data.

For example, if the current data state of application data specifies the position of a model at location $X=5$ and the data state associated with the state handle specifies that this model is positioned at location $X=1$, then step 515 will generate a cumulative operation adapted to change the location X from 1 to 5.

Following step 515, step 520 reverts the data state of the application data back to the data state associated with the state handle. Step 520 then provides the generated cumulative operation to the data application for processing. The cumulative operation is also added to the sequence of operations after the state handle set in step 505. As described in method 200, this cumulative operation replaces any other previously added operations after this state handle in the sequence of operations. Following the execution of this generated cumulative operation, the data state of the application is the same as it would be following the execution of the most-recently received incremental operation. However, the sequence of operations following the state handle set in step 505 will only include the cumulative operation.

Following step 520, step 525 waits for the receipt of an additional operation for processing. Decision block 530 determines if the operation received in step 525 is an incremental operation of a similar type to that received in step 505. In an embodiment, incremental operations are of a similar type if both operations can be represented by a single cumulative operation. If these incremental operations are of similar type, then steps 515, 520, and 525 are repeated for the most recently received incremental operation from step 525. Steps 515, 520, and 525 may be repeated an arbitrary number of times. Each iteration of steps 515, 520, and 525 replaces the previously stored cumulative operation in the sequence of operations with a new cumulative operation based on the net change in the data state between the state handle and the data state following the execution of the most-recently received incremental operation.

Conversely, if the operation received in step 525 is not an incremental operation, then optional step 535 may remove the state handle set in step 505. Step 540 the provides the received operation to the data application for execution.

Further embodiments of the invention may use state handles to speculatively execute operations for purposes of error detection, user guidance, or optimization. For example, an embodiment of a data application may automatically set a state handle for the current state and speculatively execute one or more operations. The speculatively executed operations may be selected by analyzing the user interactions and/or the data state. An embodiment of the invention analyzes the results of the speculatively executed operations and then automatically reverts the application data back to the data state associated with the state handle. In an embodiment, this process of speculative execution and reversion is performed in the background and is not visible to users.

If one or more of the speculatively executed operations fails, an embodiment of the data application may provide a message or indicator to the user based on the error. For example, a message may tell the user that additional actions must be taken to avoid this error. In another example, one or more commands may be temporarily disabled to prevent this error from occurring. In a further example, a message may inform the user of the action that must be taken to avoid the error. The data application may automatically reactivate a command once the appropriate action to avoid the error has been performed.

In another example, an embodiment of the data application may speculatively execute several alternative operations associated with a command on all or a portion of the application data. This embodiment of the data application may then analyze the results of each of these alternative operations to identify one or more of the operations providing the best results, in terms of computational efficiency, accuracy, quality of results, or any other criteria. If the user then decides to execute this command, an embodiment of the data application will execute this command by executing the operation that provided the best results from the previous speculative execution.

Figure 6:
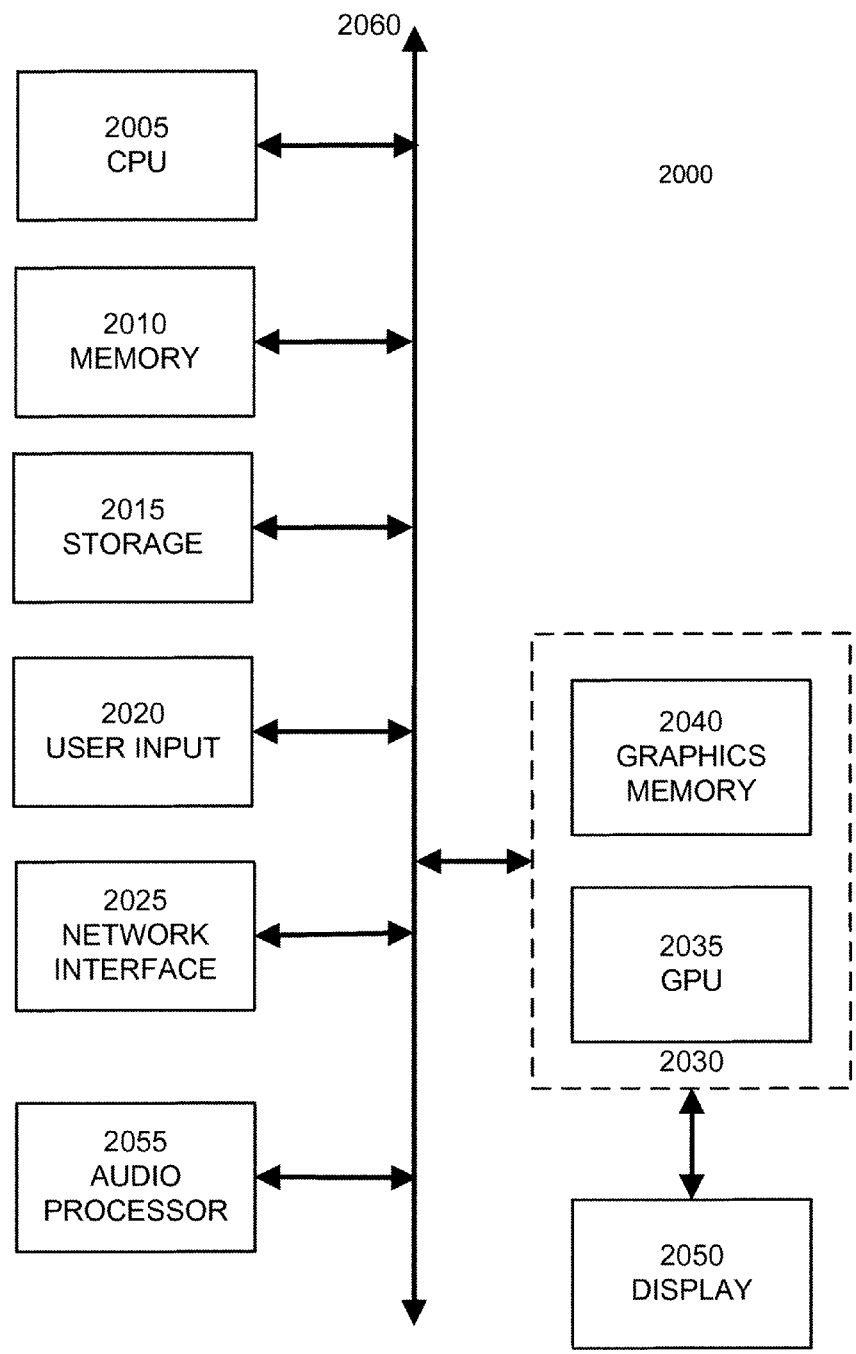
FIG. 6 illustrates a computer system suitable for implementing embodiments of the invention.

FIG. 6 illustrates a computer system 2000 suitable for implementing embodiments of the invention. FIG. 6 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art. In other embodiments, combinations or subcombinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of maintaining alternate data states of application data, the method comprising:
    receiving an operation to be added to a location in a first sequence of operations adapted to reconstruct at least a first data state of application data of a first application, the first data state resulting from performing one or more functions associated with the first sequence of operations;
    upon determining that the location is at an end of the first sequence of operations, then:
        creating an association between the received operation and the location in the first sequence of operations; and
        adding the received operation to the first sequence of operations;
    upon determining that the location is not at the end of the first sequence of operations, then:
        upon determining that there is at least a second data state of the application data of the first application selected for preservation following the location in the first sequence of operations, then:
            creating an association between a second sequence of operations and the location in the first sequence of operations; and
            adding the received operation to the second sequence of operations.

2. The method of claim 1, wherein adding the received operation to the second sequence of operations comprises: changing the location to follow the received operation in the second sequence of operations.

3. The method of claim 1, wherein the location in the first sequence of operations is determined at least in part by an undo function adapted to reverse at least one operation in the first sequence of operations.

4. The method of claim 1, wherein the location in the first sequence of operations is determined at least in part by a redo function adapted to re-execute at least one previously performed operation in the first sequence of operations.

5. The method of claim 1, further comprising:
    receiving a selection of at least one data state of the application for preservation prior to receiving the operation.

6. The method of claim 5, wherein the selection is received from a group consisting of:
    a user, a data application, and an application in communication with a data application.

7. The method of claim 1, wherein the first sequence of operations and the second sequence of operations define a graph structure.

8. The method of claim 7, wherein the first sequence of operations is defined by a first path through the graph structure.

9. The method of claim 1, wherein the second data state of the application data selected for preservation is at an intermediate location in the first sequence of operations.

10. The method of claim 1, wherein the second data state of the application data selected for preservation is at the end of the first sequence of operations.

11. The method of claim 1, wherein, upon determining that there is not at least the second data state of the application data of the first application selected for preservation following the location in the first sequence of operations, then replacing a portion of the first sequence of operations with the received operation.

12. The method of claim 1, further comprising:
    executing the received operation to create at least a third data state of the application data of the first application;
    wherein the received operation may be reversed to change the application data of the first application from the third data state back to the first data state.

13. The method of claim 12, wherein the received operation includes an invertible operation having a mathematical or computational inverse operation, wherein the received operation may be reversed by executing the inverse operation to change the application data of the first application from the third data state back to the first data state.

14. The method of claim 12, wherein the received operation is associated with a cache of input data used by each instance of the received operation in at least one of the first and second sequences of operations, wherein the received operation may be reversed by retrieving the of input data from the cache.

15. The method of claim 1, further comprising:
    upon determining that there is not at least the second data state of the application data of the first application selected for preservation following the location in the first sequence of operations, then discarding a portion of the first sequence of operations following the location.

* * * * *